(12) United States Patent
Unitt et al.

(10) Patent No.: US 7,012,922 B1
(45) Date of Patent: Mar. 14, 2006

(54) PACKET COMMUNICATIONS SYSTEM AND METHOD

(75) Inventors: Brian M Unitt, Bishop's Stortford (GB); Michael F Grant, Bishop's Stortford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/375,710

(22) Filed: Aug. 17, 1999

(51) Int. Cl.
*H04L 12/56* (2006.01)
(52) U.S. Cl. .................... 370/395.1; 370/474; 370/537
(58) Field of Classification Search ................ 370/352, 370/353, 354, 355, 356, 395.52, 395, 61, 370/395.1, 395.2, 395.51, 395.53, 395.6, 370/401, 466, 468, 473, 474, 535, 537, 538, 370/540
See application file for complete search history.

(56) References Cited

U.S. PATENT DOCUMENTS

| | | | | |
|---|---|---|---|---|
| 5,625,407 A | * | 4/1997 | Biggs et al. | |
| 5,715,250 A | * | 2/1998 | Watanabe | 370/395.53 |
| 6,049,531 A | * | 4/2000 | Roy | 370/395.53 |
| 6,169,735 B1 | * | 1/2001 | Allen, Jr. et al. | |
| 6,212,162 B1 | * | 4/2001 | Horlin | |
| 6,285,685 B1 | * | 9/2001 | Bum | 370/474 |
| 6,339,594 B1 | * | 1/2002 | Civanlar et al. | 370/352 |
| 6,463,082 B1 | * | 10/2002 | Bergenwall et al. | |
| 6,490,273 B1 | * | 12/2002 | DeNap et al. | |
| 6,519,261 B1 | * | 2/2003 | Brueckheimer et al. | |
| 6,714,534 B1 | * | 3/2004 | Gerszberg et al. | 370/352 |
| 6,731,627 B1 | * | 5/2004 | Gupta et al. | 370/352 |

* cited by examiner

*Primary Examiner*—Kwang Bin Yao
(74) *Attorney, Agent, or Firm*—Barnes & Thornburg LLP

(57) ABSTRACT

A digital subscriber line (DSL) arrangement provides data and voice over IP (VoIP) services over a subscriber loop. Instead of conventional multiplexing at the IP layer, two separate IP packet streams are provided, one stream carrying delay insensitive data traffic and the other transporting delay sensitive traffic, in particular, packetised voice. The system segments each IP stream (i.e. those carrying voice and data) separately to produce two ATM streams which are then multiplexed using an ATM multiplexer. This reduces the delays to voice traffic resulting from queuing behind long data packets.

14 Claims, 3 Drawing Sheets

PACKET COMMUNICATIONS SYSTEM AND METHOD

FIELD OF THE INVENTION

This invention relates to a method and apparatus for the transmission of digital voice and data traffic over a communications path in a telecommunications system or network.

BACKGROUND OF THE INVENTION

A recent development in the field of telephony has been the introduction of digital subscriber line (DSL) techniques whereby data traffic is transported over a subscriber loop to a customer. The subscriber line is coupled to a DSL line card in the local exchange whereby the DSL traffic is coupled to the subscriber line. Typically, this traffic is transported at least in the downstream direction to the customer in a discrete multi-tone (DMT) format in which the information is spread over a number of carriers.

There is increasing interest in Internet access and a continual demand to increase speed of delivery of Internet traffic to end users. For residential users it is impractical to install a large scale fibre network to allow high speed access to individual homes. Therefore there is a strong financial incentive to reuse the existing copper pair connections between the home and a central office or local exchange rather than to incur the expense of installation of new customer connections. Various systems have been devised to support higher data transmission speeds over these pairs. In particular, ADSL (asymmetric digital subscriber line) and other similar systems are under development and are currently being defined in the standards forum. A feature of ADSL is that the transmission rates in the upstream and downstream directions are asymmetric. The data rate in the downstream direction from the line card towards the customer is much higher than the upstream rate, which is typically be only 150–200 kbit/s.

There is also growing interest in transmitting conventional POTS voice traffic using packet oriented data networks. A natural progression is to use the ADSL connection to provide one or more voice connections to the customer, either in addition to or instead of the conventional baseband POTS connection. Additional POTS channels delivered in this way are known as 'derived POTS' channels. Preferably, the voice traffic is multiplexed with data traffic using the same ADSL link, this being referred to as voice over DSL. Attempts to introduce such a service have not however been entirely successful as it has been that the high quality of service requirements for voice traffic are difficult to achieve with current techniques.

Carrier class voice requires certain quality criteria to be met. In particular, the end to end delay experienced by the voice signal must be kept to a minimum to avoid echo and, in extreme cases, delays large enough to disrupt two way conversation.

Conventionally, IP traffic streams are multiplexed by interleaving complete packets. Since IP data packets can be quite long (an Ethernet packet could for example be up to 1500 bytes in length) a high priority voice packet might well have to wait a significant time before a transmission opportunity arises. This is a particular problem when the data transmission rate is low, such as in the upstream direction on an ADSL link. This low transmission rate is a consequence of the serial nature and the limited bandwidth of the upstream path. At a typical upstream rate of 200 kbit/s, a 1500 byte packet takes 60 msec to transmit. Thus, a voice packet might be delayed by up to 60 msec. This is a major source of delay in a packet voice network and is unacceptable for high quality voice traffic.

There is a proposal to the IETF to use a multiplexing scheme whereby long IP packets can be interrupted by short, high priority packets such as voice. This interruption is achieved by fooling the HDLC layer, which is a transmission layer below IP, that the IP data packet has finished, and then resuming the original data packet transmission after the high priority packet has been sent. However, this system is specific to links using HDLC and requires modifications to the HDLC protocol layer at each end of the link. It is thus not readily adaptable to general ADSL use.

A second potential source of delay arises from the time taken to collect enough digitised voice samples to fill a voice packet. Conventionally, when using standard telephony pulse code modulation (64 kbit/s), a voice sample is produced every 125 microseconds, each sample being represented by one byte. To maintain transmission efficiency, it is desirable that the payload of a packet should be relatively long compared to its header which conveys essential addressing information but otherwise incorporates no useful revenue earning data. In a system based on Internet protocol (IP), voice traffic would normally be sent using UDP and RTP protocol layers above IP. Each layer requires its own header which contains information related to the corresponding layer. The total length of such a header can be at least 40 bytes. Thus, for 75% efficiency (say) the payload length should be 120 bytes. Using 64 kbit/s PCM this implies a packetisation time of 15 msec. This is again undesirable for efficient voice transport.

OBJECT OF THE INVENTION

An object of the invention is to minimise or to overcome the above disadvantages.

A further object of the invention is the provision of an improved method and apparatus for the transmission over a subscriber loop of streams of packet traffic having differing transmission latency requirements.

A further object of the invention is the provision of a method and apparatus for improving bandwidth efficiency of packet switched traffic in a network.

A further object of the invention is to provide an improved voice over IP service to a telephone subscriber.

SUMMARY OF THE INVENTION

According to a first aspect of the invention, there is provided a method of transporting packet voice and data traffic over a communication path, the method comprising generating a first packet stream carrying the voice traffic, generating a second packet stream carrying the data traffic, segmenting said first and second packet streams into respective first and second ATM cell streams, and multiplexing said first and second ATM cell streams together for transport over said path.

According to another aspect of the invention, there is provided a method of transporting first and second packet streams having respective first and second priority levels over a communications path, the method comprising segmenting said first and second packet streams into respective first and second ATM cell streams, and multiplexing said first and second ATM cell streams together for transport over said path.

According to a further aspect of the invention, there is provided an arrangement for transporting a first packet stream comprising digitally encoded voice traffic and a second packet stream comprising data traffic over a communication path, the arrangement comprising means for segmenting said first and second packet streams into respective first and second ATM cell streams, and multiplexing means for multiplexing said first and second ATM cell streams together for transport over said path.

According to a further aspect of the invention, there is provided an subscriber station for providing digital communication with an access multiplexer over a subscriber loop, the subscriber station incorporating means for generating a first packet stream comprising digitally encoded voice traffic and a second packet stream comprising data traffic, means for segmenting said first and second packet streams into respective first and second ATM cell streams, and multiplexing means for multiplexing said first and second ATM cell streams together for transport to the access multiplexer over said subscriber loop.

Instead of conventional multiplexing at the IP layer, two separate IP packet streams are provided, one stream carrying delay insensitive data traffic and the other transporting delay sensitive traffic, in particular, packetised voice. The system segments each IP stream (i.e. those carrying voice and data) separately to produce two ATM streams which are then multiplexed using an ATM multiplexer.

Conventionally, ADSL links to individual customers are terminated on the network side in a DSL access multiplexer (DSLAM) where signals from many customers are multiplexed together. From this point a high speed link is used to connect to other network equipment. Since, employing the techniques described herein, the link speed becomes far less significant in terms of queuing delay, the ATM layer can consequently be terminated in the DSLAM and conventional IP multiplexing can be used through the remainder of the network if desired.

Advantageously, header compression can be employed to further improve the efficiency of the voice channel.

BRIEF DESCRIPTION OF THE DRAWINGS

Embodiments of the invention will now be described with reference to the accompanying drawings in which:—

DESCRIPTION OF PREFERRED EMBODIMENT

Figure 1:
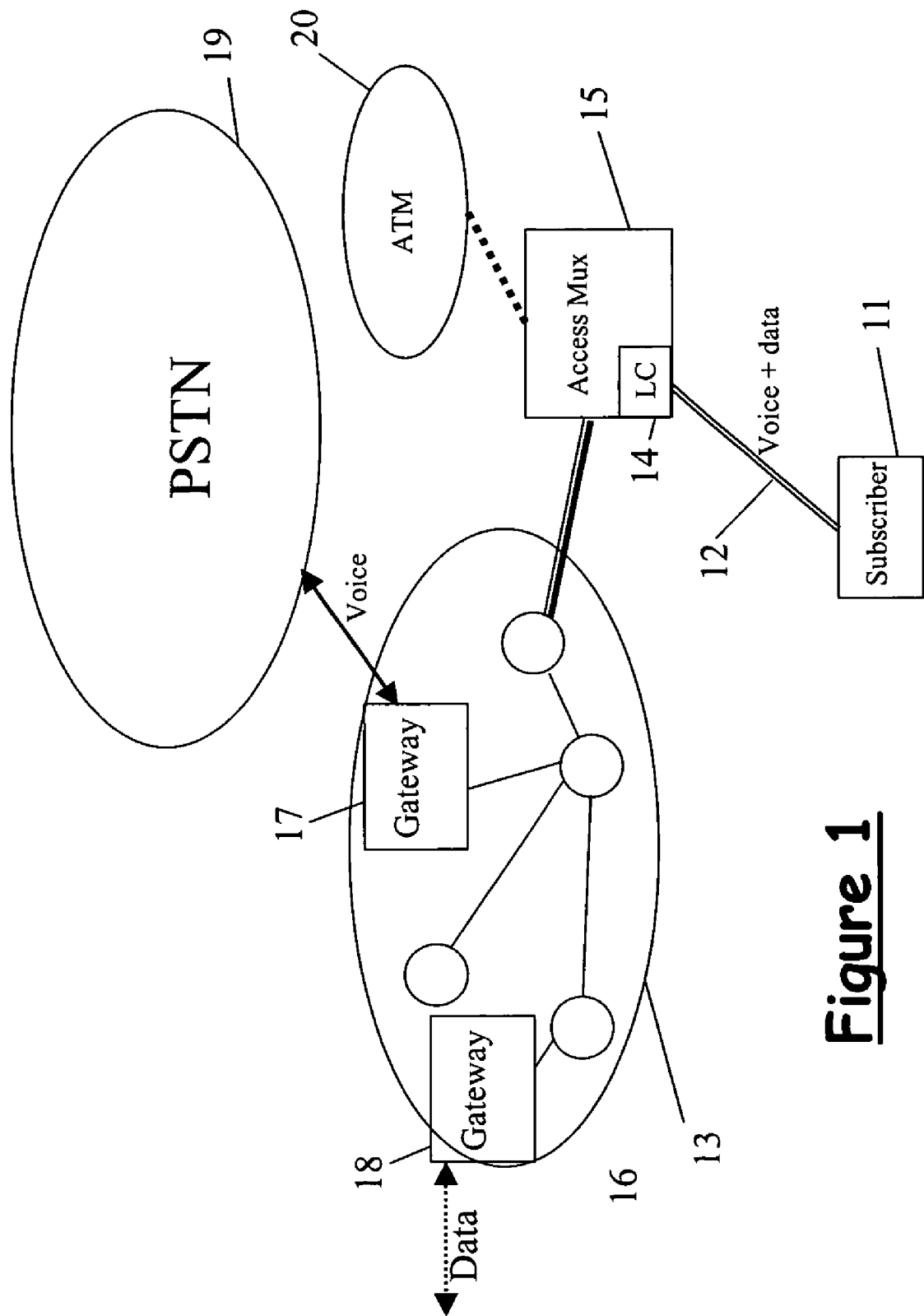
FIG. 1 is a general view of a network arrangement according to a preferred embodiment of the invention for delivering data and voice over IP services to subscribers.

Referring first to FIG. 1, this illustrates in schematic form a network arrangement providing digital subscriber line access to subscribers. In the exemplary network of FIG. 1, subscribers 11 are provided with asymmetric digital subscriber line (ADSL) network access for both voice and data over the subscriber loop or twisted copper pair 12. It will however be understood that the techniques described by way of example below are in no way limited to this particular digital subscriber line protocol. Each DSL subscriber or customer is served from an IP network 13 via a respective line card 14 disposed at an access multiplexer 15 to which the subscriber loop 12 is connected. The arrangement provides the subscriber with Internet data and voice over IP services. It will be appreciated that although, for clarity, only one subscriber connection to the access multiplexer is shown, this device will of course serve a large number of subscribers.

Figure 2:
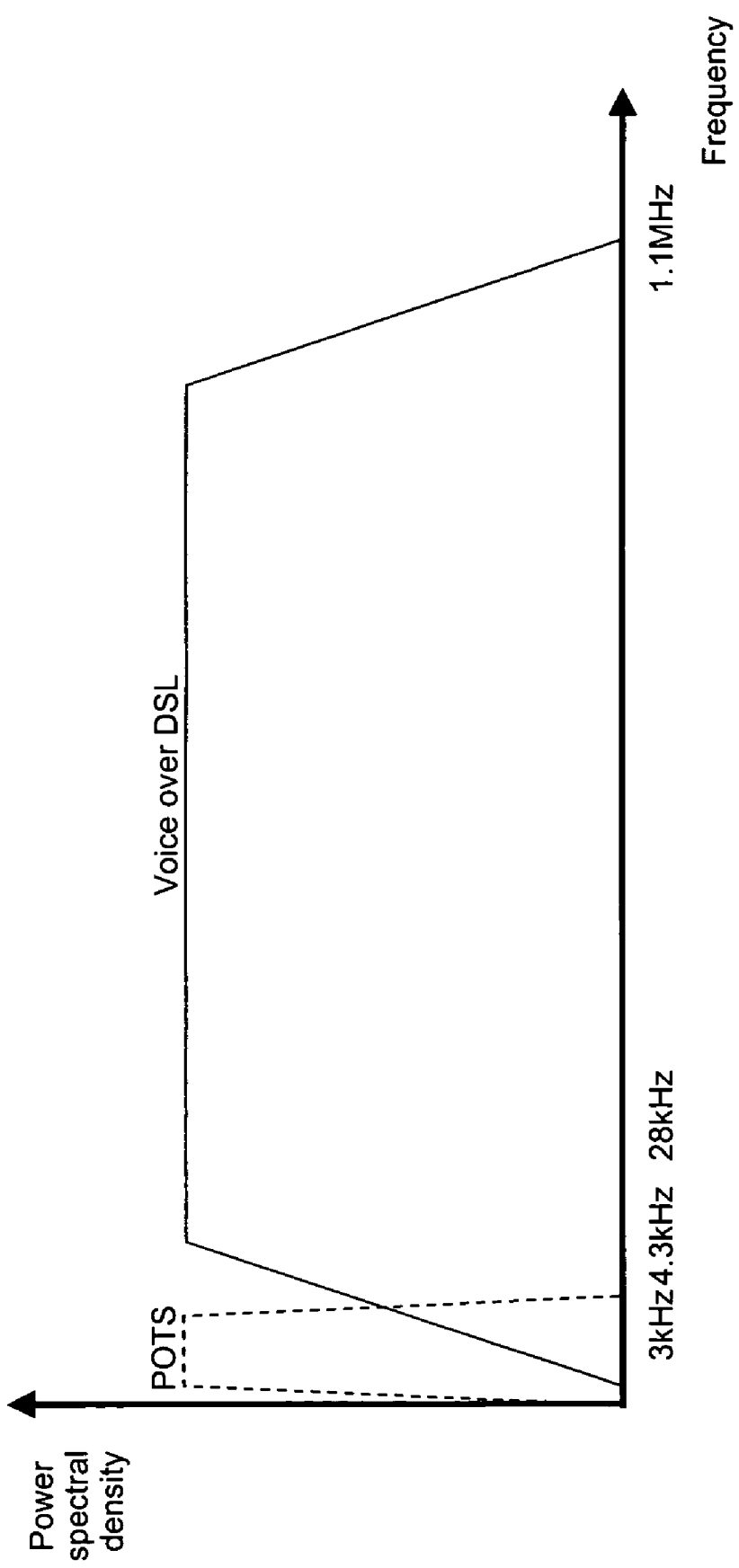
FIG. 2 illustrates the upstream and downstream spectrum of an ADSL subscriber loop.

Data and voice traffic are transported over the subscriber loop 12 by the use of discrete multi-tone (DMT) carriers. The loop may also, if desired, carry a traditional POTS service to the subscriber. A typical spectrum is illustrated in FIG. 2. As can be seen from FIG. 2, the voice band of the spectrum is allocated to POTS, and a further band from about 25 kHz to 138 kHz is allocated to upstream ADSL data and voice. The remainder of the spectrum up to about 1.1 MHz is allocated to downstream ADSL.

As shown in FIG. 1, the IP network 13 incorporates a number of nodes 16 and one or more gateways 17, 18 providing access to a PSTN 19 and a data network (not shown) respectively. Further gateways (not shown) may provide access e.g. to video services.

Figure 3:
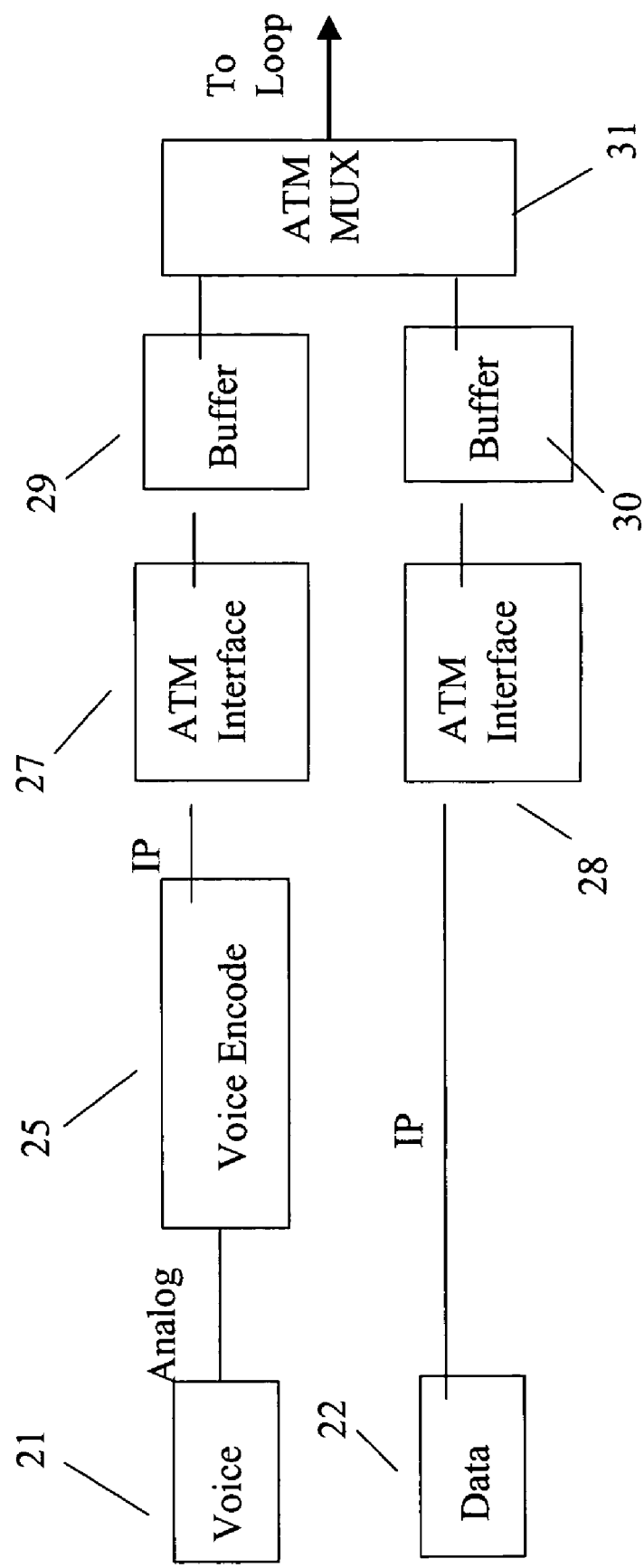
FIG. 3 shows a typical subscriber installation in the network of FIG. 1.

Referring now to FIG. 3, this shows in schematic form the construction of the subscriber installation and illustrates in particular the upstream transmission process. For clarity, the downstream transmission path has been omitted from FIG. 3. As shown in FIG. 3, the subscriber installation incorporates a voice terminal 21 and a date terminal 22. A video terminal (not shown) may also be provided. Upstream data traffic from the data terminal 22 is in the form of IP packets which will, in general, be of variable length and each incorporating a header containing information relating to the routing of the packet and, optionally, priority information. Upstream traffic from the voice terminal 21 is digitised and packetised into fixed length IP packets via voice encoding and packetising device 25. The analogue voice signal from the voice terminal is sampled and each sample is encoded as a digital code. The voice encoding device 25 uses standard telephony pulse code modulation (64 kbit/s) and generates fixed length IP packets each incorporating a payload comprising the digitised voice and a header containing priority and destination information. The construction of voice encoding and packetising equipment will be well understood by those skilled in the art.

The data and voice IP packet streams are each fed to a respective ATM segmentation interface 27, 28 where the data and voice IP packet streams are packed into respective first and second ATM cell streams. Preferably ATM Adaptation Layer 5 (AAL5) is used for this purpose. It will be appreciated that, as a result of this process, long data IP packets will be spread over a number of consecutive ATM cells.

The two ATM cell streams carrying the data and voice traffic are fed via respective FIFO buffers 29, 30 to an ATM multiplexer 31 whereby the two packet streams are multiplexed for upstream transmission over the subscriber loop to the access multiplexer 13 (FIG. 1). The buffers will normally be incorporrated in the respective ATM interfaces. The ATM multiplexer may accept cells alternately from the two cell streams, or priority may be given to voice cells when such cells are queued in the buffer 29 for dispatch. By segmenting the IP packets prior to multiplexing for transport over the subscriber loop, the problem of delay of voice packets by long data packets is overcome as the segmentation provides a means for a voice packet to "interrupt" a data packet.

At the access multiplexer 15, the data and voice ATM cells received over the subscriber loop are de-multiplexed and are re-assembled into respective IP packets for transport over a high speed link to the IP network 13, the header information being employed for the routing of each packet across the IP network. It will be understood that the high speed link can carry traffic from all the line cards in the access multiplexer.

In an alternative embodiment, the ATM data and voice call streams are not re-assembled at the access multiplexer 13, but are launched directly into an ATM network 20.

In a further advantageous embodiment, header compression may be employed for further enhancing the efficiency of voice transport. It will be appreciated that data packets may be sent to any of a very large number of destinations and that it is therefore necessary to provide an appropriately sized header field, typically forty bytes, that contains a sufficient number of bytes to convey this information to the network routers. However, as discussed above, the need to incorporate a large header field in a voice packet can limit the efficiency of the voice transmission which is accompanied by a relatively large volume of header information. Applicants have appreciated that although a large header field is required for a data packet which may be routed anywhere, voice packets will be routed in the IP network to only a small number of destinations, typically to the voice gateways 17. Thus, the conventional forty byte data header may be reduced to as few as 2 bytes. Algorithms for this compression are known within the IETF (Internet Engineering task Force).

It will be appreciated that, as header compression requires co-operation between all routing nodes through which the header compressed traffic passes, it is desirable to limit the extent of the compressed portion of the network. Generally, compressed header voice packets from different customers will be directed at the same destination, namely a gateway device for interfacing with other networks such as a PSTN. In some cases, more than one destination gateway may be involved, but in a practical network, the number of gateways required for high priority or voice packets will be small. In either case, compressed header packets from several customers will be directed at the same destination. To avoid the need for all network routing elements to implement header compression algorithms, compressed header packets directed at a particular gateway can be embedded in a conventional IP packet for onward transmission as a common channel. Since many payloads are now aggregated, the single full IP header no longer represents a significant overhead.

As an alternative embodiment, the compressed header packets could be transmitted over part or all of the network path to the gateway in a single ATM virtual circuit.

It will be understood that although exemplary embodiments of the invention have been described above with particular reference to an ADSL service, the technique is of general application to other digital subscriber line protocols.

It will be further understood that the above description of preferred embodiments is given by way of example only and that various modifications may be made by those skilled in the art without departing from the spirit and scope of the invention.

What is claimed is:

1. A method of transporting packet voice and data traffic over a low bandwidth upstream communication path from a subscriber location, the method comprising performing at the subscriber location the steps of: generating a first internet protocol (IP) packet stream carrying the voice traffic; generating a second IP packet stream carrying the data traffic; segmenting said first and second IP packet streams into respective first and second ATM cell streams; and multiplexing said first and second ATM cell streams together for transport over said upstream communication path.

2. A method as claimed in claim 1, wherein said upstream communication path comprises a telephone subscriber loop.

3. A method as claimed in claim 2, wherein said subscriber loop carries a asymmetric digital subscriber line (ADSL) service.

4. A method as claimed in claim 3, wherein said first and second cell streams are adaptation layer five (AAL5) cell streams.

5. A method as claimed in claim 4, wherein said first and second cell streams are re-assembled into respective voice and data packets for transport over an IP network.

6. A method as claimed in claim 5, wherein said voice packets are routed within the IP network to one or more gateways providing access to a PSTN.

7. A subscriber station for providing digital communication with an access multiplexer over a subscriber loop, the subscriber station incorporating means for generating a first IP packet stream comprising digitally encoded voice traffic and a second IP packet stream comprising data traffic, means for segmenting said first and second IP packet streams into respective first and second ATM cell streams, and multiplexing means for multiplexing said first and second ATM cell streams together for transport to the access multiplexer over said subscriber loop.

8. A method of transporting packetised delay sensitive and delay insensitive traffic on a low bandwidth upstream communications path from a subscriber location, the method comprising performing at the subscriber location the following steps:
generating a first packet stream carrying the delay sensitive traffic according to a first packet protocol;
generating a second packet stream carrying the delay insensitive traffic according to said first protocol;
segmenting said first and second packet streams into respective first and second streams in accordance with a second packet protocol; and
multiplexing said first and second packet streams formed in accordance with said second packet protocol for transport over the upstream communication path, wherein said second packet protocol has a packet length that is smaller than that of the first packet protocol.

9. A method according to claim 8, wherein the first packet protocol is the Internet Protocol (IP) and the second protocol is the Asynchronous Transfer Mode (ATM) Protocol.

10. A method according to claim 8, wherein said upstream communication path is a subscriber loop carrying a asymmetric digital subscriber line (ADSL) service.

11. A method according to claim 8, wherein the first packet stream comprising said delay sensitive traffic comprises digitally encoded voice traffic and said second packet stream comprising said delay insensitive traffic comprises data traffic.

12. A subscriber station for providing communication with an access multiplexer over a low bandwidth, upstream communications path, comprises:
means for generating a first packet stream carrying the delay sensitive traffic according to a first packet protocol;
means for generating a second packet stream carrying the delay insensitive traffic according to said first protocol;
means for segmenting said first and second packet streams into respective first and second streams in accordance with a second packet protocol; and
means for multiplexing said first and second packet streams formed in accordance with said second packet protocol for transport over the upstream communication path, wherein said second packet protocol has a packet length that is smaller than that of the first packet protocol.

13. A subscriber station according to claim 12, wherein the first packet protocol is IP and the second packet protocol is ATM.

14. A subscriber station according to claim 12, wherein the upstream communication path comprises a subscriber loop carrying an ADSL service.

* * * * *